United States Patent
Liu

(10) Patent No.: US 12,013,992 B2
(45) Date of Patent: Jun. 18, 2024

(54) TOUCHPAD MODULE HAVING ELASTIC MEMBERS CONNECTED TO FIXING PLATFORM THROUGH CANTILEVER BEAMS AND ELECTRONIC APPARATUS USING TOUCHPAD MODULE THEREOF

(71) Applicant: SHENZHEN GOODIX TECHNOLOGY CO., LTD., Shenzhen (CN)

(72) Inventor: Xiangying Liu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/074,854

(22) Filed: Dec. 5, 2022

(65) Prior Publication Data
US 2023/0289000 A1     Sep. 14, 2023

(30) Foreign Application Priority Data

Mar. 11, 2022   (CN) .......................... 202210249829.X

(51) Int. Cl.
G06F 3/0354    (2013.01)
G06F 3/01      (2006.01)

(52) U.S. Cl.
CPC .......... *G06F 3/03547* (2013.01); *G06F 3/016* (2013.01)

(58) Field of Classification Search
CPC .... G06F 3/03547; G06F 3/016; G06F 3/0338; G06F 3/0202; G06F 1/169; G06F 1/1671
See application file for complete search history.

(56) References Cited

U.S. PATENT DOCUMENTS

| | | |
|---|---|---|
| 7,960,663 B2 | 6/2011 | Yoshihiro |
| 8,829,378 B2 | 9/2014 | Villain |
| 8,964,378 B2 | 2/2015 | Kao et al. |
| 9,292,051 B2 | 3/2016 | Takata |
| 9,465,416 B2 | 10/2016 | Shen et al. |
| 10,261,550 B2 | 4/2019 | Huang |

(Continued)

FOREIGN PATENT DOCUMENTS

| | | |
|---|---|---|
| CN | 1945507 A | 4/2007 |
| CN | 103809684 A | 5/2014 |

(Continued)

OTHER PUBLICATIONS

International Search Report of PCT/CN2022/094326 issued on Feb. 6, 2023.

(Continued)

*Primary Examiner* — Richard J Hong
(74) *Attorney, Agent, or Firm* — Emerson, Thomson & Bennett, LLC; Roger D. Emerson; Matt J. Wilson

(57) ABSTRACT

A touchpad module, comprising: a moving part, a fixing part and a deforming part. The moving part has a touch panel, a main support member and a travel switch arranged on a bottom surface of the touch panel. The fixing part has a fixing platform, and a contact point is provided on a surface of the fixing platform close to the moving part. The deforming part is configured to elastically deform, when the touch panel is pressed, so that the moving part moves toward the fixing part along a pressing direction, and the contact point contacts and triggers the travel switch. The touchpad module provided by the present disclosure can realize a full-area pressing of the touchpad module.

18 Claims, 12 Drawing Sheets

(56) References Cited

U.S. PATENT DOCUMENTS

| | | |
|---|---|---|
| 10,459,542 B1 | 10/2019 | Costante et al. |
| 10,725,567 B1* | 7/2020 | Huang .................. G06F 1/1671 |
| 11,372,457 B1 | 6/2022 | Lee et al. |
| 11,402,931 B1 | 8/2022 | Lee |
| 11,442,562 B2 | 9/2022 | Li |
| 11,537,177 B2 | 12/2022 | Pai et al. |
| 11,556,189 B1* | 1/2023 | Lee .......................... G06F 3/016 |
| 2015/0185769 A1* | 7/2015 | Takata .................... G06F 1/169 |
| | | 345/173 |
| 2017/0153703 A1* | 6/2017 | Yun ......................... G06F 3/016 |
| 2017/0322591 A1 | 11/2017 | Lee et al. |
| 2018/0081483 A1 | 3/2018 | Camp et al. |
| 2019/0019639 A1 | 1/2019 | Lane et al. |
| 2019/0391659 A1* | 12/2019 | Woolley ................. G06F 3/016 |
| 2021/0263556 A1* | 8/2021 | Degner ................. G06F 3/0338 |
| 2022/0374094 A1* | 11/2022 | Liu ....................... G06F 3/0202 |

FOREIGN PATENT DOCUMENTS

| | | |
|---|---|---|
| CN | 203689477 U | 7/2014 |
| CN | 205986813 U | 2/2017 |
| CN | 107659699 A | 2/2018 |
| CN | 212302449 U | 1/2021 |
| CN | 113031792 A | 6/2021 |
| CN | 113296627 A | 8/2021 |
| CN | 214311665 U | 9/2021 |
| CN | 113867552 A | 12/2021 |
| CN | 215576545 U | 1/2022 |
| CN | 216052808 U | 3/2022 |
| CN | 114397969 A | 4/2022 |
| CN | 114415786 A | 4/2022 |
| CN | 114415851 A | 4/2022 |
| CN | 114637373 A | 6/2022 |
| TW | M520678 U | 4/2016 |
| TW | M604435 U | 11/2020 |

OTHER PUBLICATIONS

International Search Report of PCT/CN2022/135974 issued on Feb. 23, 2023.

International Search Report of PCT/CN2022/130554 issued on Jan. 11, 2023.

* cited by examiner

TOUCHPAD MODULE HAVING ELASTIC MEMBERS CONNECTED TO FIXING PLATFORM THROUGH CANTILEVER BEAMS AND ELECTRONIC APPARATUS USING TOUCHPAD MODULE THEREOF

CROSS-REFERENCE TO RELATED APPLICATIONS

This application claims priority to the Chinese Patent Application No. 202210249829.X, filed on Mar. 11, 2022, and entitled "TOUCHPAD MODULE AND ELECTRONIC APPARATUS USING TOUCHPAD MODULE", the disclosure of which is hereby incorporated by reference in its entirety.

TECHNICAL FIELD

The present disclosure relates to the technical field of touch control, and in particular, to a touchpad module and an electronic apparatus using the touchpad module.

BACKGROUND

With technological innovation and progress, a touchpad of a laptop has implemented and replaced the functionality of an external mouse. As an input function of the touchpad becomes more powerful, consumers have higher requirements for experience.

As shown in FIG. 1(a), an existing detachable touchpad is composed of two components: a touch panel 1 and mechanical buttons 2. The touch panel 1 cannot implement a press function and has a more complex structure, which affects human-computer interaction and appearance effects. As shown in FIG. 1(b), an integrated touchpad combines the touch panel and the buttons into a whole board. A travel switch is arranged at a lower part of the module, and the press function is realized by a single pendulum structure. However, when pressing, only a lower half-area 3 has the function, and the touchpad module takes up a lot of space in the entire touchpad, affecting battery capacity. In addition, the consistency of the feel when pressing is not good, which affects user experience.

SUMMARY

The present disclosure provides a touchpad module and an electronic apparatus using the touchpad module, which can realize full-area pressing of the touchpad, and can realize balanced force feedback when a user presses.

In a first aspect, a touchpad module is provided, including:

a moving part, where the moving part has a touch panel, a main support member and a travel switch arranged on a bottom surface of the touch panel, the main support member is arranged on an edge of the bottom surface of the touch panel, and the main support member has a first border and a second border opposite to each other;

a fixing part, where the fixing part has a fixing platform, and a contact point is provided on a surface of the fixing platform close to the moving part; and a deforming part, where the deforming part has a first elastic member, a second elastic member, a first connecting member and a second connecting member, the first connecting member is attached to the first elastic member, the second connecting member is attached to the second elastic member, the first elastic member is connected between the first border of the main support member and the fixing platform, and the second elastic member is connected between the second border of the main support member and the fixing platform;

the deforming part is configured to elastically deform, when the touch panel is pressed, so that the moving part moves toward the fixing part along a pressing direction, and the contact point contacts and triggers the travel switch.

In some possible implementations, the first elastic member includes a first main body portion, a first elastic arm and a second elastic arm, and the first main body portion, the first elastic arm and the second elastic arm form a first U-shaped sheet structure; and the second elastic member includes a second main body portion, a third elastic arm and a fourth elastic arm, and the second main body portion, the third elastic arm and the fourth elastic arm form a second U-shaped sheet structure.

In some possible implementations, the first elastic member further includes a first cantilever beam and a second cantilever beam arranged on one side of the first main body portion, and a third cantilever beam and a fourth cantilever beam arranged on the other side of the first main body portion, the first elastic member is connected to the first border of the main support member through the first cantilever beam and the second cantilever beam, and the first elastic member is connected to the fixing platform through the third cantilever beam and the fourth cantilever beam.

In some possible implementations, the second elastic member further includes a fifth cantilever beam and a sixth cantilever beam arranged on one side of the second main body portion, and a seventh cantilever beam and an eighth cantilever beam arranged on the other side of the second main body portion, the second elastic member is connected to the second border of the main support member through the fifth cantilever beam and the sixth cantilever beam, and the second elastic member is connected to the fixing platform through the seventh cantilever beam and the eighth cantilever beam.

In some possible implementations, the first elastic member and the second elastic member are symmetrically arranged with respect to a center of the touchpad module, the first elastic arm is butted with the third elastic arm, the second elastic arm is butted with the fourth elastic arm, and an opening portion for accommodating the fixing platform is formed between the first elastic member and the second elastic member.

In some possible implementations, a first gap exists between the first elastic arm and the third elastic arm and between the second elastic arm and the fourth elastic arm.

In some possible implementations, the first elastic member and the second elastic member are integrally formed, so that the first elastic arm and the third elastic arm are connected, and the second elastic arm and the fourth elastic arm are connected, a through hole is provided in a center of a connection position of the first elastic arm and the third elastic arm such that the first elastic arm and the third elastic arm are partially connected, and a through hole is provided in a center of a connection position of the second elastic arm and the fourth elastic arm such that the second elastic arm and the fourth elastic arm are partially connected.

In some possible implementations, the first connecting member is attached to the first U-shaped sheet structure of the first elastic member; and the second connecting member is attached to the second U-shaped sheet structure of the second elastic member.

In some possible implementations, the first connecting member has a first support arm and a second support arm, the first support arm is configured to reinforce the first elastic arm, and the second support arm is configured to reinforce the second elastic arm; and the second connecting member has a third support arm and a fourth support arm, the third support arm is configured to reinforce the third elastic arm, and the fourth support arm is configured to reinforce the fourth elastic arm.

In some possible implementations, the first support arm has a first protruding portion, the first protruding portion extends to an area where the third elastic arm is disposed, so that the first support arm partially overlaps the third elastic arm, the third support arm has a third protruding portion, the third protruding portion extends to an area where the first elastic arm is disposed, so that the third support arm partially overlaps the first elastic arm, and the first protruding portion and the third protruding portion do not interfere with each other; and the second support arm has a second protruding portion, the second protruding portion extends to an area where the fourth elastic arm is disposed, so that the second support arm partially overlaps the fourth elastic arm, the fourth support arm has a fourth protruding portion, the fourth protruding portion extends to an area where the second elastic arm is disposed, so that the fourth support arm partially overlaps the second elastic arm, and the second protruding portion and the fourth protruding portion do not interfere with each other.

In some possible implementations, the touch panel includes a cover plate and a circuit board, the cover plate is connected to the circuit board through a fixing glue for the cover plate, and the circuit board is connected to the main support member through an adhesive glue.

In some possible implementations, the circuit board is a printed circuit board PCB, or a flexible printed circuit board FPC.

In some possible implementations, the touch panel includes a cover plate and a circuit board, a size of the circuit board is smaller than a size of the cover plate, the cover plate is connected to the circuit board through a fixing glue for the cover plate, and the cover plate is connected to the main support member through an adhesive glue.

In some possible implementations, the circuit board is a flexible printed circuit board FPC.

In some possible implementations, the travel switch is arranged in a center of a bottom surface of the circuit board.

In some possible implementations, the contact point is an adjusting screw, and an adjusting nut is provided in a center of the fixing platform for fixing the adjusting screw.

In some possible implementations, the contact point is a conductive base, and there is a gap between the conductive base and the travel switch.

In some possible implementations, the fixing platform is configured with fixing screws through which the touchpad module is fixedly connected to an electronic apparatus housing.

In some possible implementations, the fixing platform is provided with a fixing member, the fixing member is provided with a through hole outside a projection area of the cover plate, and the touchpad module is fixedly connected to an electronic apparatus housing through the through hole.

In some possible implementations, the fixing platform has a contact surface that is bent and recessed in a direction away from the cover plate, and the contact surface is fixedly connected to an electronic apparatus housing through a module fixing glue.

In a second aspect, an electronic apparatus is provided, including the touchpad module according to any one of the first aspect, and an electronic apparatus housing, the touchpad module is fixedly installed in the electronic apparatus housing.

DETAILED DESCRIPTION OF EMBODIMENTS

The present disclosure relates to touchpads for computers such as laptops, notebooks, tablets, and related electronic apparatus. In general, electronic apparatus, especially portable electronic apparatus, are decreasing in size, and it is not desirable to add buttons on a device housing due to the lack of surface area for receiving touch and gesture input. Existing touchpads are rotatable when pressed by users because they are pivotally connected to hinges along an edge of their rectangular shape. This type of touchpad may be referred to as a "diving pad" and requires lower click force at an end away from a hinge support edge of the touchpad. It is difficult to click near the hinge support edge, that is, the consistency of click and press force on the entire touchpad is poor, which makes user experience poor and functions of the touchpad are also affected.

The present disclosure relates to a touchpad module, which can realize full-area pressing of the touch panel, and may realize balanced force feedback at any position on the touchpad, thereby improving user experience.

In order to make the objectives, technical solution and advantages of the present disclosure clearer, the present disclosure will be further described in detail below with reference to embodiments. It should be understood that the specific embodiments described herein are only used to explain the present disclosure, but not to limit the present disclosure.

Embodiment 1

Figure 1A:
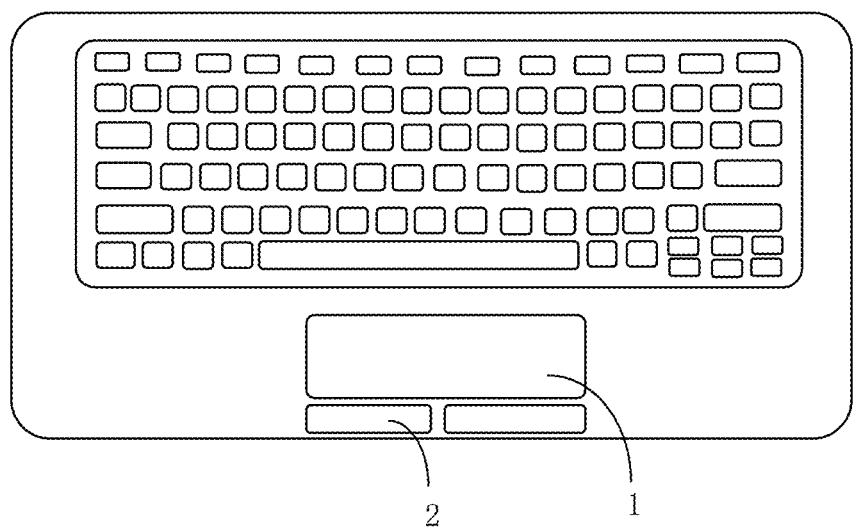
FIG. 1 is a schematic structural diagram of an existing touchpad module.
Figure 1B:
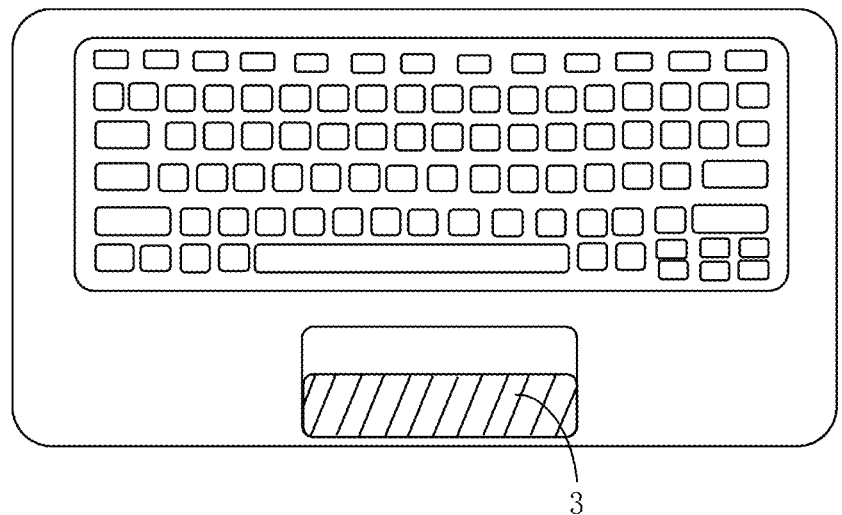
Figure 2:
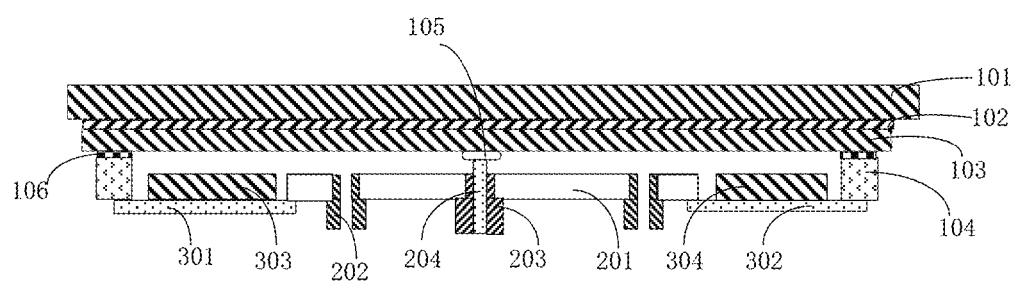
FIG. 2 is a cross-sectional view of a structure of a touchpad module provided in Embodiment 1 of the present disclosure.
Figure 3:
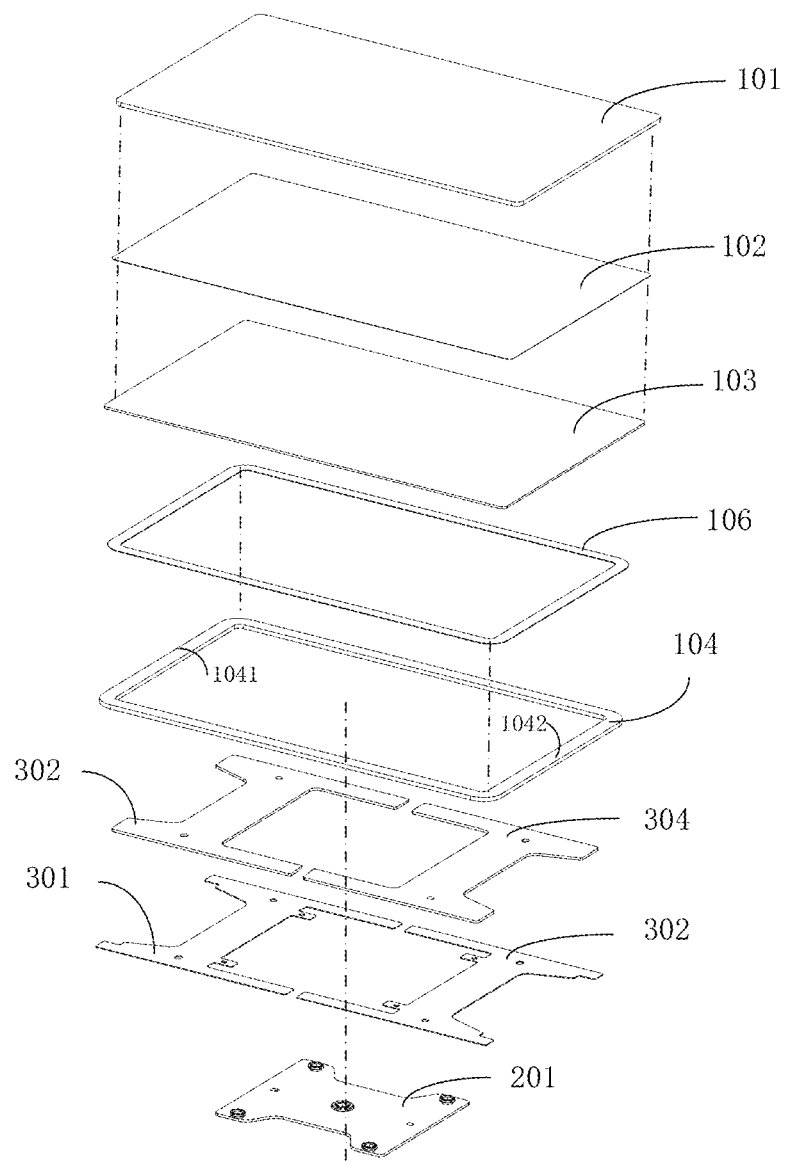
FIG. 3 is an exploded diagram of the structure of the touchpad module provided in Embodiment 1 of the present disclosure.

As shown in the figures, FIG. 2 is a cross-sectional view of a structure of a full-area pressing touchpad module provided in Embodiment 1 of the present disclosure. FIG. 3 is an exploded diagram of the structure of the full-area pressing touchpad module provided in Embodiment 1 of the present disclosure.

Referring to FIGS. 4(a)-(c), the touchpad or the touchpad module throughout the entire area of which pressing operation can be performed may be disassembled into three parts, including a moving part 100, a fixing part 200, and a deforming part 300.

Figure 4:
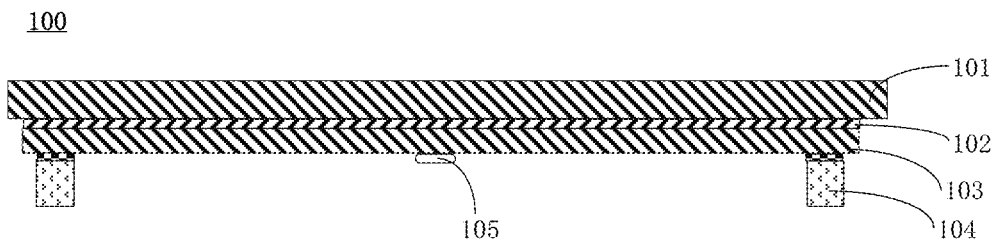
FIG. 4 are schematic structural diagrams of a moving part, a fixing part, a deforming part, and a combined part of the touchpad module provided in Embodiment 1 of the present disclosure.
Figure 4:
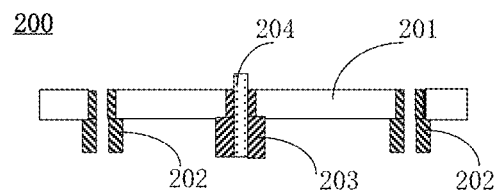
Figure 4:
Figure 4:
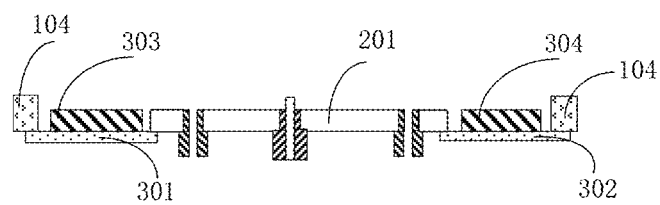

The full-area pressing touchpad module of the present disclosure will be described in detail below with reference to FIGS. 2-4.

The moving part 100 is shown in FIG. 4(a), and the moving part 100 is mainly composed of a cover plate 101, a fixing glue 102 for the cover plate, a circuit board 103, a main support member 104 and a travel switch 105;

The cover plate 101 is located on an outer surface of the entire touchpad module, and is a substantially planar rigid material sheet, a top surface of which is configured to contact one or more user objects, such as fingers, stylus, when the touchpad is operated. Accordingly, a user may provide input by clicking, swiping or pressing or otherwise applying force to the top surface of the cover plate 101 using one or more of the user objects. The material of the cover plate 101 is a rigid material, specifically may be a non-conductive rigid object such as glass, PC sheet, or ceramic sheet; and the top surface of the cover plate 101 may be smooth or rough textured, so that an appearance of the touchpad conforms to an aesthetic design of the product. The cover plate 101 may be substantially rectangular in shape, and in some preferred embodiments, edges of a rectangular outer surface of the cover plate 101 may also be rounded.

The fixing glue 102 for the cover plate is used to bond the cover plate 101 and the circuit board 103. The fixing glue 102 for the cover plate may be liquid glue or solid glue. It should be noted that, after the cover plate 101 and the circuit board 103 are bonded together through the fixing glue 102 for the cover plate, there can be no air bubbles in between;

The circuit board 103 is specifically a printed circuit board (PCB), through surface mounted technology (SMT) on the PCB, or through dual in-line package (DIP), configures a touch sensor, the travel switch 105, a connector and other electronic elements to realize printed circuit board assembly (PCBA). PCBA is used to realize a touch sensing function of the touchpad. In a possible embodiment, the touch sensor, specifically a touch sensing layer, is built into the PCB. The cover plate 101 and the circuit board 103 constitute a touch panel of a touchpad assembly, and the touch panel receives a pressing force applied by the user's touch.

As shown in FIG. 3, the main support member 104 is a rectangular border and has sufficient rigidity. The main support member 104 is fixed on an edge of a bottom surface of the circuit board 103 through an adhesive glue 106, and the main support member 104 has a first border 1041 and a second border 1042 opposite to each other.

The travel switch 105 is a flexible structure, and a position of the travel switch 105 is arranged in a center of a lower surface of the circuit board 103. The travel switch 105 may deform after being subjected to vertical force. The travel switch 105 is fixed on the circuit board 103 by bonding or SMT. The entire PCBA realizes a communication function through the connector and a laptop keyboard or leather keyboard. In other embodiments, the position of the travel switch 105 may also be set at other positions below the circuit board 103 as required.

As shown in FIG. 4(b), the fixing part 200 is composed of a fixing platform 201, fixing screws 202, an adjusting nut 203, and an adjusting screw 204. One ends of the fixing screws 202 are assembled on the fixing platform 201, and the other ends of the fixing screws 202 are fixed to a housing of the laptop keyboard or leather keyboard, and play the role of fixing and supporting the housing of the laptop keyboard or leather keyboard. The adjusting nut 203 is assembled on the fixing platform 201, so that the adjusting screw 202 is set at a position corresponding to the travel switch 105 and protrudes from an upper surface of the fixing platform 201 to form a contact point for triggering the travel switch 105.

More specifically, the contact point for triggering the travel switch 105 is realized by the adjusting screw 204. After the touchpad is assembled, a height of the contact point protruding from the fixing platform and a gap between the contact point and the travel switch 105 are adjusted by the adjusting screw 204, to ensure the consistency of a pressing feel. The adjusting screw needs to be self-locking and a thread of the screw should be coated with anti-fall glue to ensure that the adjusting screw does not loosen after being pressed and used, ensuring reliability.

As shown in FIG. 4(c), the deforming part 300 is composed of a first elastic member 301, a second elastic member 302, a first connecting member 303 and a second connecting member 304, the first connecting member 303 is attached to the first elastic member 301, and the second connecting member 304 is attached to the second elastic member 302. Due to the elasticity of the elastic members, a product form of the elastic members is thin and weak in strength, and connecting members with similar shapes are used for reinforcement and support, where the first connecting member 303 is configured to reinforce the first elastic member 301, and the second connecting member 304 is configured to reinforce the second elastic member 302. The connecting members are configured to support the elastic members by being attached to surfaces of the elastic members close to the cover plate 101 side. The two connecting members and the two elastic members are arranged symmetrically, the first elastic member 301 and the first connecting member 303 are arranged on the left side of the fixing platform, and the second elastic member 302 and the second connecting member 304 are arranged on the right side of the fixing platform.

Figure 5:
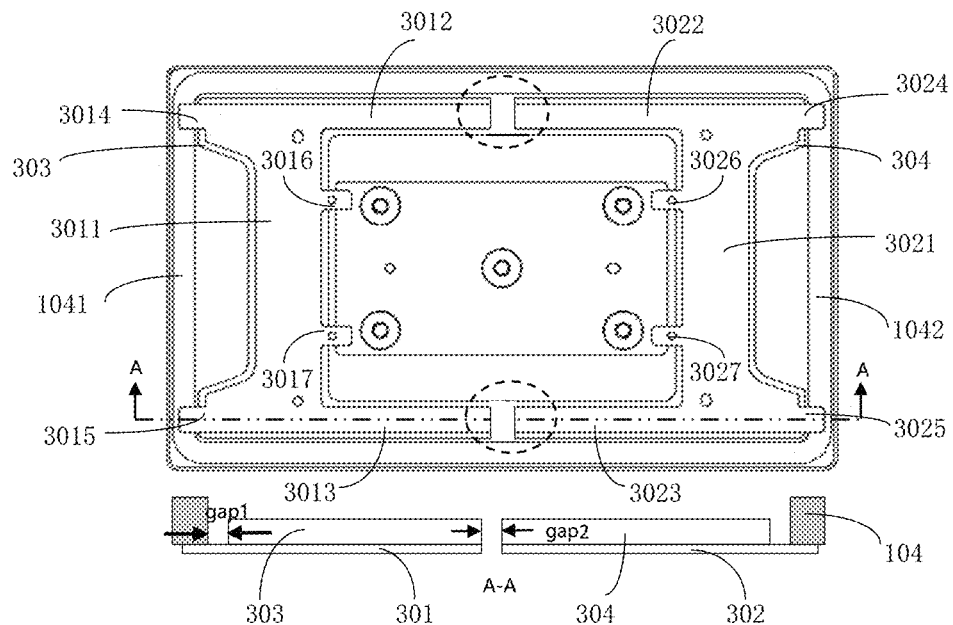
FIG. 5 is a bottom view of the touchpad module provided in Embodiment 1 of the present disclosure.

As shown in FIG. 4(d), is a schematic diagram of a combined structure of the moving part+the fixing part+an elastic part of the touchpad module except the touch panel. FIG. 5 is a bottom view of the full pressing touchpad module provided in Embodiment 1 of the present disclosure, FIG. 6 is a perspective view of the full-area pressing touchpad module provided in Embodiment 1 of the present disclosure, and FIG. 7 is a partial exploded diagram of the full-area pressing touchpad module provided in Embodiment 1 of the present disclosure.

Figure 6:
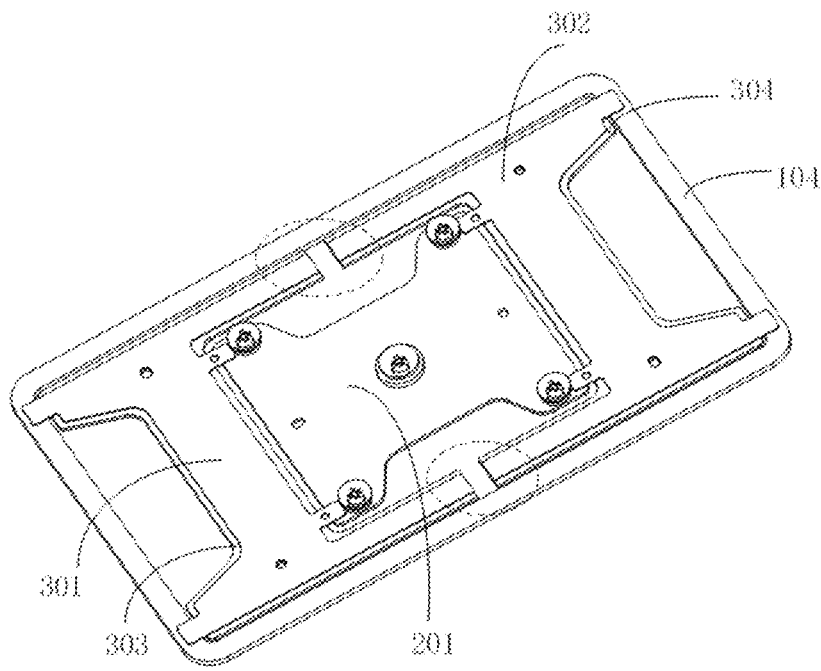
FIG. 6 is a perspective view of the touchpad module provided in Embodiment 1 of the present disclosure.
Figure 7:
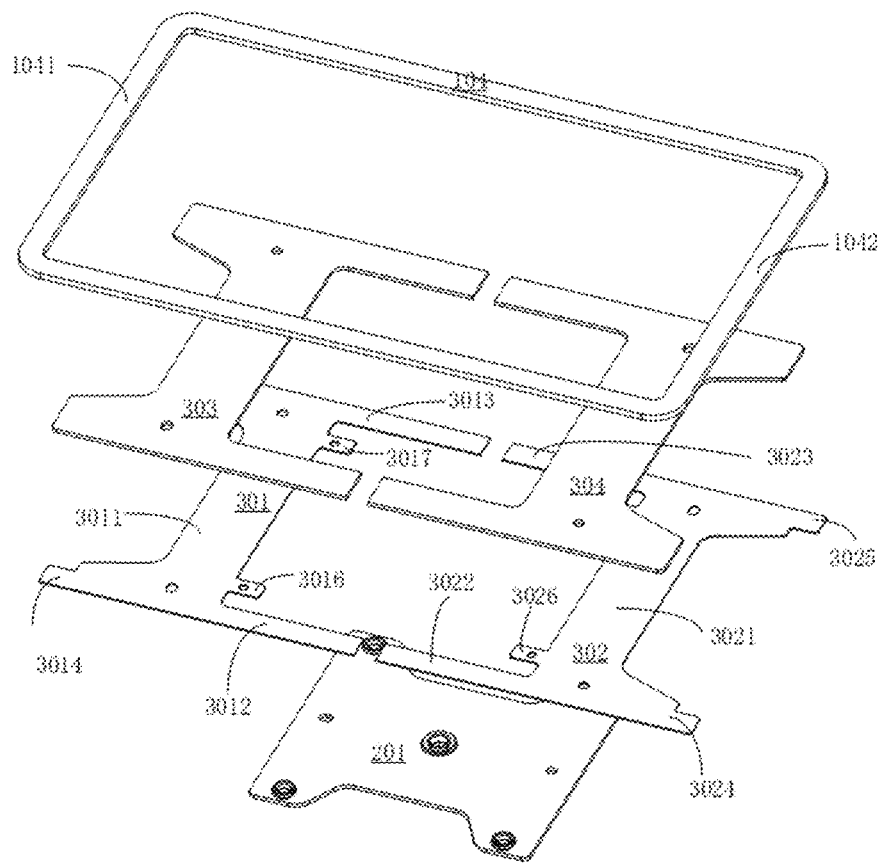
FIG. 7 is a partial exploded diagram of the touchpad module provided in Embodiment 1 of the present disclosure.

As shown in FIGS. 5-7, the first elastic member 301 is connected between the first border 1041 of the main support member 104 and the fixing platform 201, and the second elastic member 302 is connected between the second border 1042 of the main support member 104 and the fixing platform 201;

the first elastic member 301 includes a first main body portion 3011, a first elastic arm 3012 and a second elastic arm 3013, and the first main body portion 3011, the first elastic arm 3012 and the second elastic arm 3013 form a roughly U-shaped sheet structure; and the second elastic member 302 includes a second main body portion 3021, a third elastic arm 3022 and a fourth elastic arm 3023, and the second main body portion 3021, the third elastic arm 3022 and the fourth elastic arm 3023 form a roughly U-shaped sheet structure. A suspended distance gap2>0.3 mm is kept between the first elastic arm 3012 and the third elastic arm 3022, and a suspended distance gap2>0.3 mm is kept between the second elastic arm 3013 and the fourth elastic arm 3023. The first elastic member 301 and the second elastic member 302 do not overlap.

The first elastic member 301 further includes a first cantilever beam 3014, a second cantilever beam 3015 arranged on one side of the first main body portion 3011, and a third cantilever beam 3016 and a fourth cantilever beam 3017 arranged on the other side of the first main body portion 3011, the first elastic member 301 is connected to the first border 1041 of the main support member 104 through the first cantilever beam 3014 and the second cantilever beam 3015, and the first elastic member 301 is connected to the fixing platform 201 through the third cantilever beam 3016 and the fourth cantilever beam 3017. It can be seen that the first elastic member 301 is connected between the main support member 104 and the fixing platform 201 through the cantilever beam structures.

The second elastic member 302 further includes a fifth cantilever beam 3024, a sixth cantilever beam 3025 arranged on one side of the second main body portion 3021, and a seventh cantilever beam 3026 and an eighth cantilever beam 3027 arranged on the other side of the second main body portion 3021, the second elastic member 302 is connected to the second border 1042 of the main support member 104 through the fifth cantilever beam 3024 and the sixth cantilever beam 3025, and the second elastic member 302 is connected to the fixing platform through the seventh cantilever beam 3026 and the eighth cantilever beam 3027. It can be seen that the second elastic member 302 is connected between the main support member 104 and the fixing platform 201 through the cantilever beam structures. Specifically, the first elastic member 301 is located on the left side of the fixing platform, and the second elastic member 302 is located on the right side of the fixing platform. The two elastic members and the fixing platform are arranged in the rectangular border formed by the main support member 104. The first elastic member 301 and the second elastic member 302 are symmetrically arranged with respect to a center of the touchpad module, the first elastic arm 3012 is butted with the third elastic arm 3022, the second elastic arm 3013 is butted with the fourth elastic arm 3023, and an opening portion for accommodating the fixing platform 201 is formed between the first elastic member 301 and the second elastic member 302.

The two connecting members are not in contact with the main support member 104 and do not interfere with each other. The connecting members are attached to the U-shaped sheet structures of the elastic members, that is, the elastic members are not covered and reinforced by the connecting members at positions of the cantilever beams. A suspended distance gap1>0.4 mm is kept between the two connecting members and the main support member 104 to deform the elastic members. In other words, suspended parts where the connecting members and the main support member are only connected by the elastic members are called cantilever beams, and suspended parts where the connecting members and the fixing platform are only connected by the elastic members are also called cantilever beams.

The fixing platform 201 is arranged in the middle of the rectangular border of the main support member 104, and the two elastic members respectively connect the main support member 104 and the fixing platform 201 through the four cantilever beams on both sides of the main body portions of the U-shaped sheet structure. The main support member 104 is fixed on the circuit board PCBA through the adhesive glue, and the fixing platform 201 is fixed to the housing of the laptop keyboard or leather keyboard through the fixing screws. Based on this, the deforming part 300 connects the moving part 100 and the fixing part 200 through the cantilever beam structures; in a possible implementation, the connection between the first elastic member 301, the second elastic member 302, the first connecting member 303, the second connecting member 304, the main support member 104 and the fixing platform 201 is joined together by a welding process, such as laser welding.

Operating principles of the touchpad throughout the entire area of which pressing operation can be performed are as follows:

After the user presses a central area of the cover plate 101 of the touchpad, the moving part 100 is elastically deformed by the cantilever beam structures, so that the touchpad moves downward along the pressing direction until the contact point formed by the adjusting screw 204 on the fixing platform 201 triggers the travel switch 105, thereby realizing a touch pressing function; when the user presses the left/right side of the cover plate 101 of the touchpad, the moving part 100 is moved downward by the cantilever beam structures, so that the deforming part 300 is deformed and moved downward on the fixing platform 201 with bottom surfaces of the fixing screws 202 as a support platform, and the moving part 100 continuously moves downward to contact the contact point formed by the adjusting screw 204 on the fixing platform to trigger the travel switch to realize the pressing function. That is, when the cover plate 101 is pressed, the deforming part 300 elastically deforms, so that the moving part 100 moves toward the fixing part 200 along the pressing direction, and the contact point contacts and triggers the travel switch 105.

Figure 8:
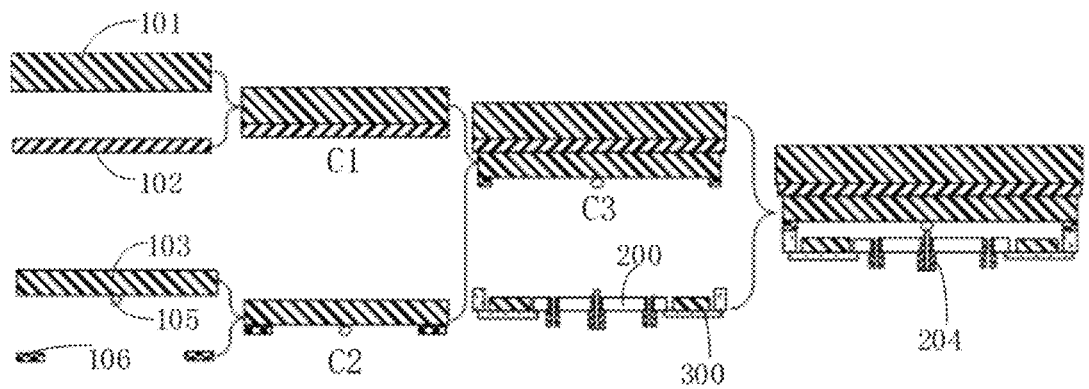
FIG. 8 is a flowchart of assembling the touchpad module provided in Embodiment 1 of the present disclosure.

As shown in FIG. 8, an assembly process of the touchpad module throughout the entire area of which pressing operation can be performed includes:

(1) The cover plate 101 and the fixing glue 102 for the cover plate are attached to form a component 1 to ensure that there is no air bubble between the cover plate 101 and the fixing glue 102 for the cover plate; (2) After the PCBA 103 is assembled, the PCBA is attached to the adhesive glue 106 to form a component 2; (3) The component C1 and the component C2 are attached to form a component 3 through the fixing glue 102 for the cover plate; (4) The component C3 and the fixing part 200 plus the deforming part 300 are attached to form the module; (5) A travel of the adjusting screw 204 is adjusted to ensure the feel.

Figure 9:
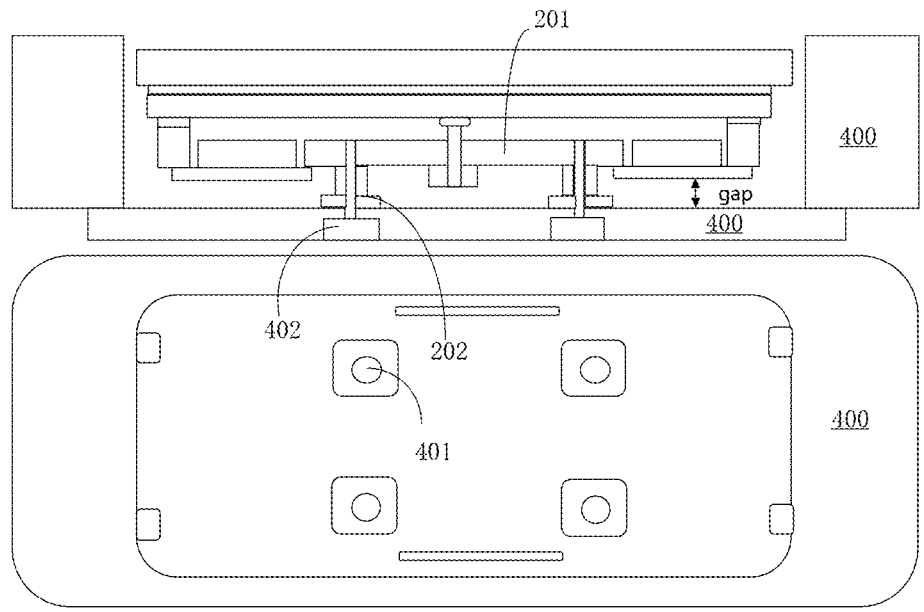
FIG. 9 is an application installation diagram of an entire touchpad provided in Embodiment 1 of the present disclosure.

The above touchpad module is integrally installed in an electronic apparatus using the touchpad module, as shown in FIG. 9, blind holes may be opened on a housing 400 of the electronic apparatus, and the touchpad module is fixedly connected to the housing 400 of the electronic apparatus through the four fixing screws 202 on the fixing platform 201, and is limited by heads of screw posts 402 in an installation direction. The touchpad module is fixed at a distance of more than 0.3 mm lower than a surface of the electronic apparatus housing 400 to prevent scratches. The elastic members of the touchpad module and a bottom of the electronic apparatus housing 400 need to keep a distance of more than 0.6 mm to ensure the travel of pressing; the connection of the fixing screws 202 on the fixing platform 201 to the housing 400 of the electronic apparatus may take up battery space when applied to laptops, thus it is more applied to interactive devices without batteries, such as tablet leather keyboards.

Embodiment 2

The structure provided in the present embodiment is a further optimization of the deforming part 300 of the touchpad in Embodiment 1.

Figure 10:
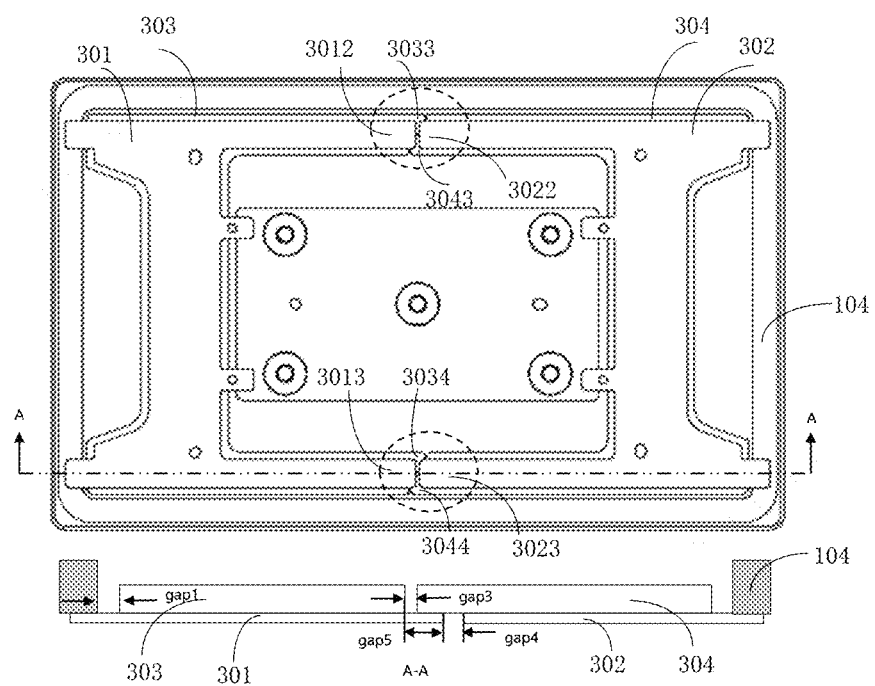
FIG. 10 is a bottom view of a touchpad module provided in Embodiment 2 of the present disclosure.
Figure 11:
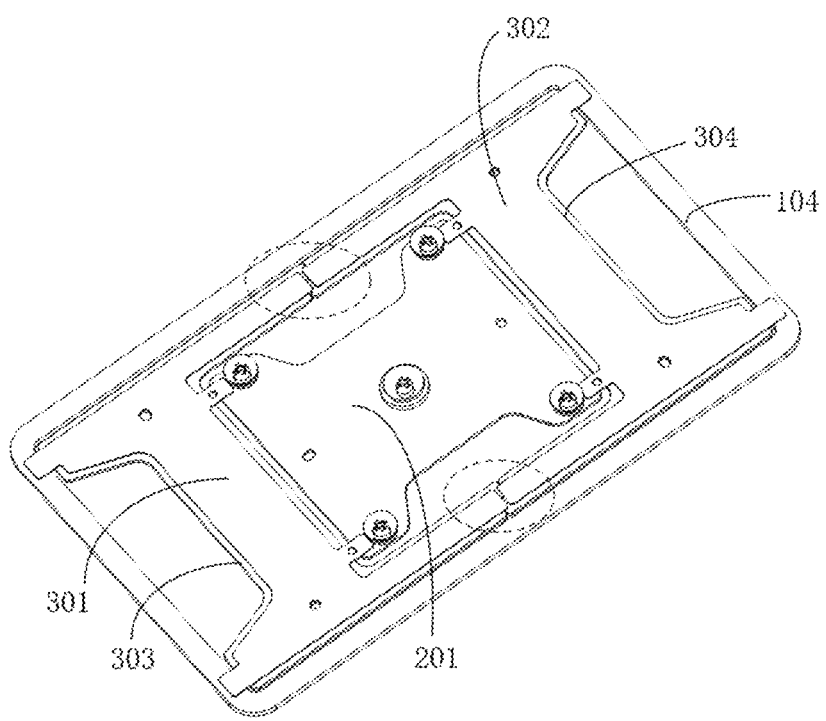
FIG. 11 is a perspective view of the touchpad module provided in Embodiment 2 of the present disclosure.
Figure 12:
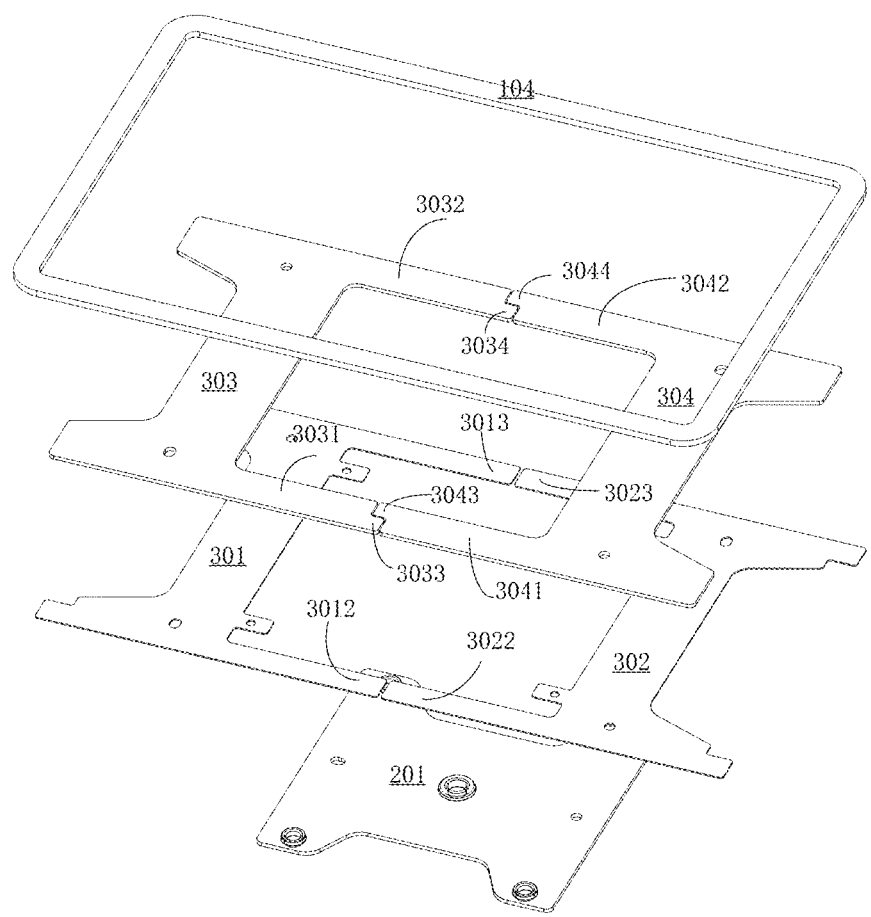
FIG. 12 is a partial exploded diagram of the touchpad module provided in Embodiment 2 of the present disclosure.

FIG. 10 is a bottom view of a full-area pressing touchpad module provided in Embodiment 2 of the present disclosure, FIG. 11 is a perspective view of the full-area pressing touchpad module provided in Embodiment 2 of the present disclosure, and FIG. 12 is a partial exploded diagram of the full-area pressing touchpad module provided in Embodiment 2 of the present disclosure.

As shown in FIGS. 10-12, a linkage connection structure is formed between the first elastic member 301, the second elastic member 302, the first connecting member 303 and the second connecting member 304, so that when pressing the left side of the touchpad, force is transmitted to the right side through the elastic arm structure, the right side also moves downward at the same time, and when pressing the right side of the touchpad, force is transmitted to the left side through the elastic arm structure, the left side also moves downward at the same time.

Specifically, the first connecting member 303 has a first support arm 3031 and a second support arm 3032, the first support arm 3031 is configured to reinforce the first elastic arm 3012, and the second support arm 3032 is configured to reinforce the second elastic arm 3013; and the second connecting member 304 has a third support arm 3041 and a fourth support arm 3042, the third support arm 3041 is configured to reinforce the third elastic arm 3022, and the fourth support arm 3042 is configured to reinforce the fourth elastic arm 3023;

the first support arm 3031 has a first protruding portion 3033, the first protruding portion 3033 extends to an area where the third elastic arm 3022 is disposed, so that the first support arm 3031 partially overlaps the third elastic arm 3022, the third support arm 3041 has a third protruding portion 3043, the third protruding portion 3043 extends to an area where the first elastic arm 3012 is disposed, so that the third support arm 3041 partially overlaps the first elastic arm 3012, and the first protruding portion 3033 and the third protruding portion 3043 do not interfere with each other; and the second support arm 3032 has a second protruding portion 3034, the second protruding portion 3034 extends to an area where the fourth elastic arm 3023 is disposed, so that the second support arm 3032 partially overlaps the fourth elastic arm 3023, the fourth support arm 3042 has a fourth protruding portion 3044, the fourth protruding portion 3044 extends to an area where the second elastic arm 3013 is disposed, so that the fourth support arm 3032 partially overlaps the second elastic arm 3013, and the second protruding portion 3034 and the fourth protruding portion 3044 do not interfere with each other.

More specifically, the first support arm 3031 and the third elastic arm 3022 overlaps through the first protruding portion 3033; the second support arm 3032 and the fourth elastic arm 3023 overlaps through the second protruding portion 3034; the third support arm 3041 and the first elastic arm 3012 overlaps through the third protruding portion 3043; and the fourth support arm 3042 and the second elastic arm 3013 overlaps through the fourth protruding portion 3044.

Further, in terms of structural design, gap3>0.2 mm needs to be ensured between the first connecting member 303 and the second connecting member 304, and gap4>0.5 mm needs to be ensured between the first elastic member 301 and the second elastic member 302. A part of the first elastic member 301 on the left covers an area of the second connecting member 304 on the right, a part of the second elastic member 302 on the right covers an area of the first connecting member 303 on the left, an intersecting and overlapping area of the two gap5>0.8 mm, and the elastic members in the overlapping areas are not fixed.

In the present embodiment, the moving part 100 and the fixing part 200 are the same as those described in Embodiment 1 except for the above linkage connection structure of the deforming part 300.

Figure 13:
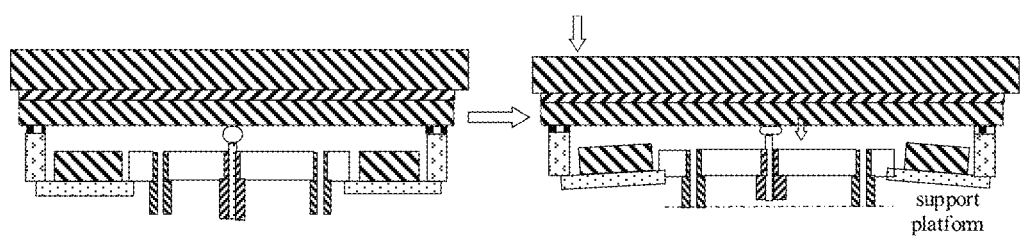
FIG. 13 is a schematic diagram of a pressing movement of the touchpad provided in Embodiment 2 of the present disclosure.

Referring to a static state and a movement process of the touchpad module in a pressed state as shown in FIG. 13, operating principles of the touchpad throughout the entire area of which pressing operation can be performed are as follows:

After the user presses the central area of the cover plate 101 of the touchpad, the moving part 100 is elastically deformed by the cantilever beam structures, so that the touchpad moves downward along the pressing direction until the contact point formed by the adjusting screw 204 on the fixing platform 201 triggers the travel switch 105, thereby realizing the touch pressing function; when the user presses the left side of the cover plate 101 of the touchpad, the left side of the moving part 100 moves downward, through the linkage connection structure, the first elastic member 301 and the first connecting member 303 moving downward on the left side drive the second elastic member 302 and the second connecting member 304 on the right side to move downward at the same time, through the cantilever beam structures, the deforming part 300 is deformed and moved downward on the fixing platform 201 with the bottom surfaces of the fixing screws 202 as the support platform, and the moving part 100 as a whole continuously moves downward to contact the contact point formed by the adjusting screw 204 on the fixing platform to trigger the travel switch to realize the pressing function. FIG. 13 shows a schematic diagram of movement of the touchpad module from a static state to a pressing movement state.

Embodiment 3

The structure provided in the present embodiment is a further optimization of the deforming part 300 of the touchpad in Embodiment 1.

Figure 14:
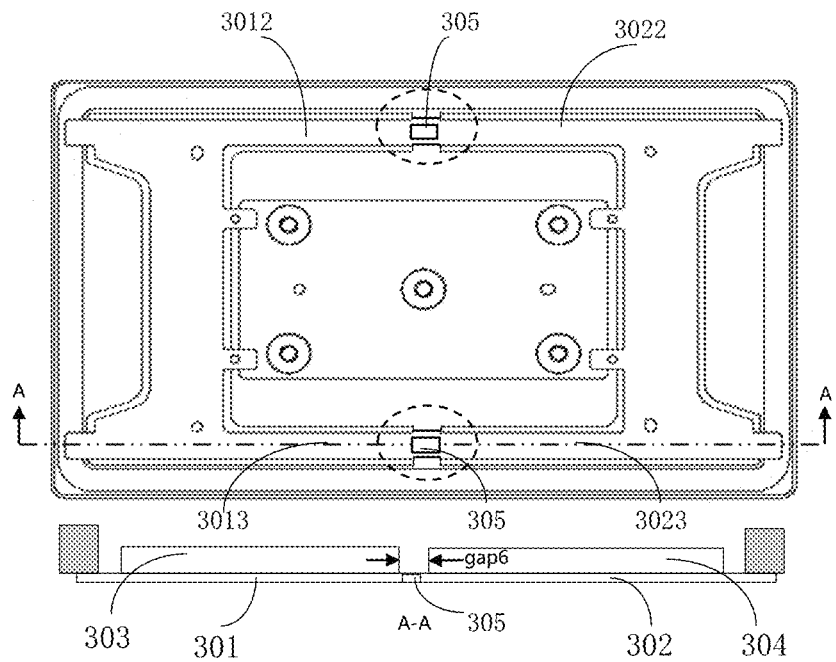
FIG. 14 is a bottom view of a touchpad module provided in Embodiment 3 of the present disclosure.
Figure 15:
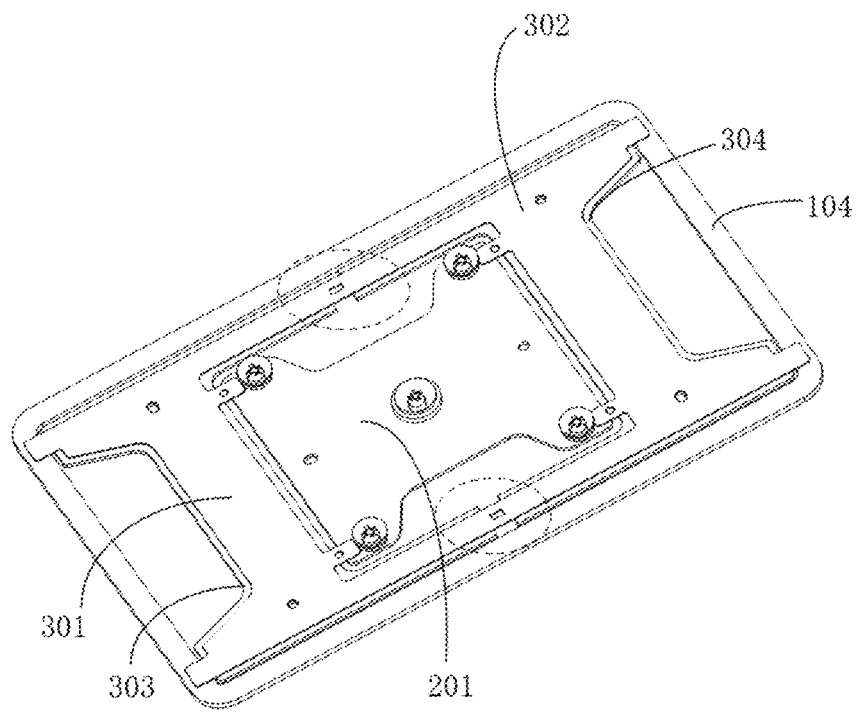
FIG. 15 is a perspective view of the touchpad module provided in Embodiment 3 of the present disclosure.
Figure 16:
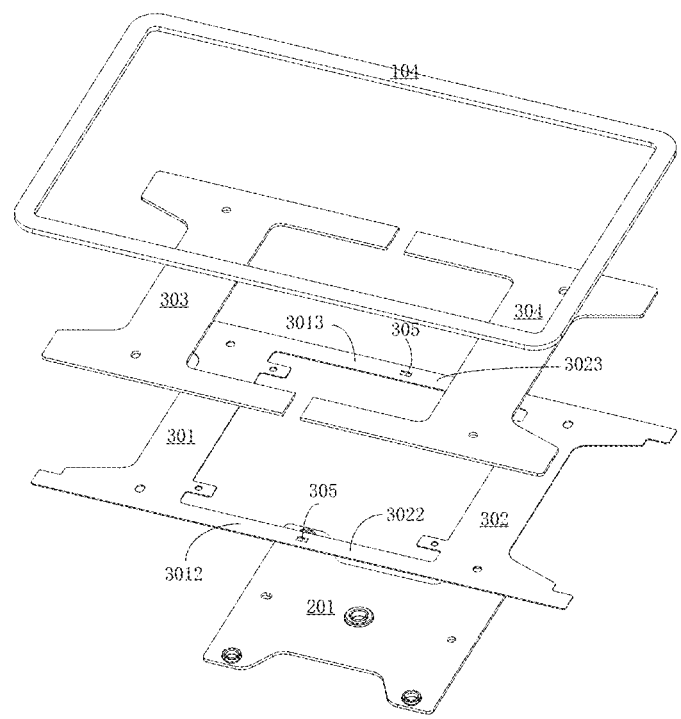
FIG. 16 is a partial exploded diagram of the touchpad module provided in Embodiment 3 of the present disclosure.

FIG. 14 is a bottom view of a full-area pressing touchpad module provided in Embodiment 3 of the present disclosure, FIG. 15 is a perspective view of the full-area pressing touchpad module provided in Embodiment 3 of the present disclosure, and FIG. 16 is a partial exploded diagram of the full-area pressing touchpad module provided in Embodiment 3 of the present disclosure.

As shown in FIGS. 14-16, the first elastic member 301 and the second elastic member 302 are integrally formed, so that the first elastic arm 3012 and the third elastic arm 3022 are connected, and the second elastic arm 3013 and the fourth elastic arm 3023 are connected, the two elastic members are combined into one member. A through hole 305 is provided in a center of a connection position of the elastic arms, so that the first elastic arm 3012 and the third elastic arm 3022 are partially connected, and the second elastic arm 3013 and the fourth elastic arm 3023 are partially connected. Combining the left and right elastic members into one member makes production and assembly more convenient. The through hole 305 is opened at the center where the left and right elastic arms of the elastic member are connected, so that the elastic member may be more easily deformed at the opening. Due to the connection between the left and right elastic members in the above structure, when the left side of the touchpad is pressed, the elastic arm connection structure conducts force to the right side so that the right side also moves downward at the same time, and when the right side of the touchpad is pressed, the elastic arm connection structure conducts force to the left side so that the left side also moves downward at the same time, the operating principles are the same as those of Embodiment 2.

In the present embodiment, the moving part 100 and the fixing part 200 are the same as those described in Embodiment 1 except for the above linkage connection structure of the deforming part 300.

Embodiment 4

The structure provided in the present embodiment is another alternative embodiment of the adjusting screw on the touchpad in the above embodiment.

Figure 17:
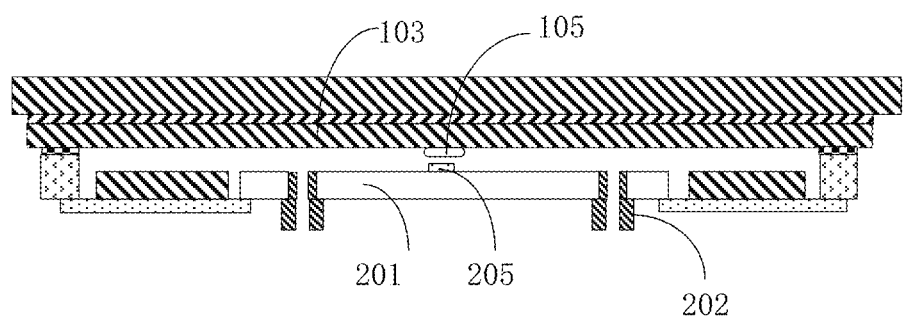
FIG. 17 is a schematic structural diagram of a touchpad provided in Embodiment 4 of the present disclosure.

As shown in FIG. 17, the fixing part 200 is composed of the fixing platform 201, the fixing screws 202, and a conductive base 205. The fixing screws 202 are assembled on the fixing platform 201, and play the role of fixing and supporting a housing of a laptop keyboard or leather keyboard. The housing of the laptop keyboard or leather keyboard specifically refers to a part of a laptop used to fix the touchpad module. A contact point formed by the conductive base 205 is arranged on the fixing platform 201 at a position corresponding to the travel switch 105 and protrudes from the upper surface of the fixing platform 201 for triggering the travel switch 105. The conductive base 205 may be realized by a fixed metal rod or silica gel. After the touchpad is assembled, there is no need to adjust the feel. However, in this solution, the touchpad module has a large pressing travel, it is necessary to leave a gap between the conductive base 205 and the travel switch 105, and the two must not interfere.

In the present embodiment, other parts are the same as those described in Embodiments 1-3 except that the conductive base 205 structure is used to replace the adjusting screw. The structure in the present embodiment is only used as an example for description, which is not intended to limit the present disclosure.

Embodiment 5

The structure provided in the present embodiment is another alternative embodiment of the fixing part 200 of the touchpad in the above embodiment.

Figure 18:
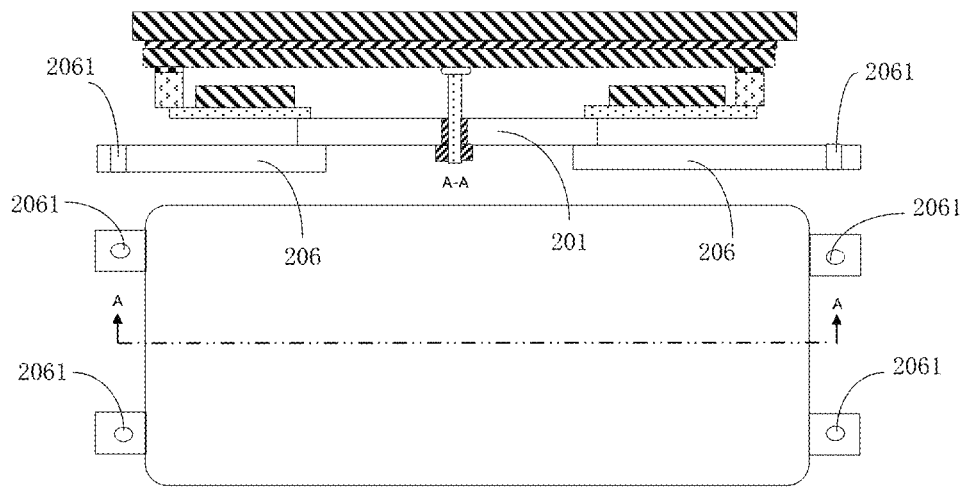
FIG. 18 is a schematic structural diagram of a touchpad provided in Embodiment 5 of the present disclosure.
Figure 19:
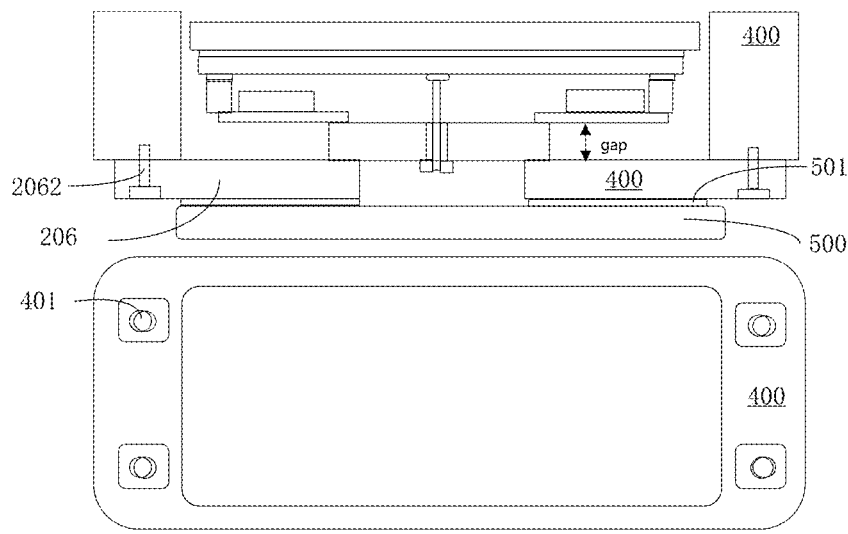
FIG. 19 is an application installation diagram of an entire touchpad provided in Embodiment 5 of the present disclosure.

As shown in FIG. 18, the fixing platform 201 is provided with a fixing member 206, the fixing member 206 is provided with a through hole 2061, the through hole 2061 is outside a projection area of the cover plate 101, and the touchpad is fixedly connected to an electronic apparatus housing 400 through the through hole 2061. By providing the fixing member 206 on the fixing platform, an outer shape of the fixing platform 201 is larger than that of the cover plate 101, and the battery space may be saved by the assembly of positions of the four peripheral through holes 2061 and the electronic apparatus housing 400. Specifically, as shown in FIG. 19, the electronic apparatus housing 400 and the fixing member 206 are fixedly connected by screws 2062, and the touchpad module is fixed at a distance greater than 0.3 mm lower than the surface of the electronic apparatus housing 400 to prevent scratches. The elastic members of the touchpad module and the bottom of the electronic apparatus housing 400 need to keep a distance of more than 0.6 mm to ensure the travel of pressing. A battery 500 is adhered to the fixing member 206 through a battery adhesive glue 501, and the above embodiment may be more applied to charged interactive devices, such as laptop computers, which may save battery space.

In addition, the fixed connection between the fixing platform and the electronic apparatus housing may be adaptively adjusted according to assembly requirements of the whole machine. The structure in the present embodiment is only used as an example for description, which is not intended to limit the present disclosure. Except for the above structure related to the fixing part, other parts are the same as those described in Embodiments 1-3.

Embodiment 6

The structure provided in the present embodiment is another alternative embodiment of the fixing part 200 of the touchpad in the above embodiment.

Figure 20:
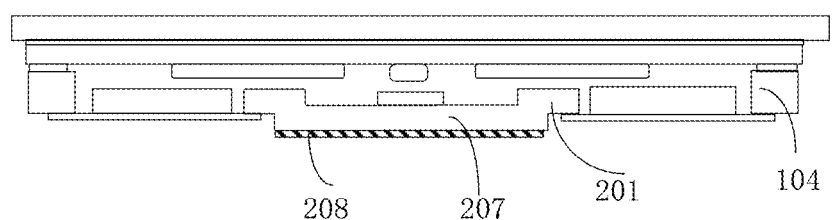
FIG. 20 is a schematic structural diagram of a touchpad provided in Embodiment 6 of the present disclosure.
Figure 21:
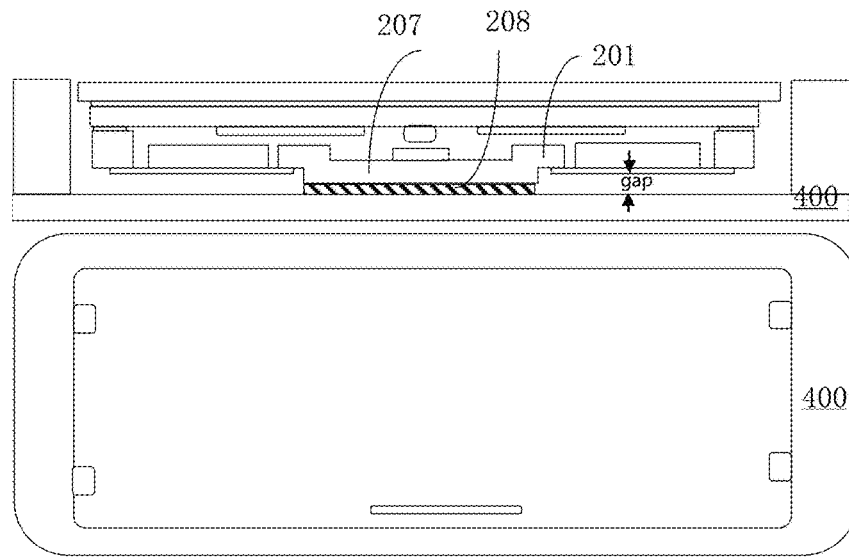
FIG. 21 is an application installation diagram of an entire touchpad provided in Embodiment 6 of the present disclosure.

As shown in FIG. 20, the fixing part 200 of the touchpad is simplified, fixing screws are cancelled, and the fixing platform 201 is bent and formed. The fixing platform 201 has a contact surface 207 that is bent and recessed in a direction away from the cover plate 101, and the contact surface 207 is fixedly connected to the electronic apparatus housing through a module fixing glue 208, that is, the contact surface 207 is fixed on the electronic apparatus housing 400 through the module fixing glue 208. As shown in FIG. 21, the touchpad module is fixed at a distance greater than 0.3 mm lower than the surface of the electronic apparatus housing 400 to prevent scratches. The elastic members of the touchpad module and the bottom of the electronic apparatus housing 400 need to keep a distance of more than 0.6 mm to ensure the travel of pressing.

In this solution, the contact point needs to be implemented with a conductive base. The conductive base may be a fixed metal rod or silica gel. After the touchpad is assembled, there is no need to adjust the feel. However, in this solution, the touchpad module has a large pressing travel, it is necessary to leave a gap between the conductive base and the travel switch, and the two must not interfere.

In the above, the structure in the present embodiment is only used as an example for description, which is not intended to limit the present disclosure. Except for the above structure related to the fixing part, other parts are the same as those described in Embodiments 1-3.

Embodiment 7

The structure provided in the present embodiment is another alternative embodiment of the circuit board 103 of the moving part 100 of the touchpad in the above embodiment.

Figure 22:
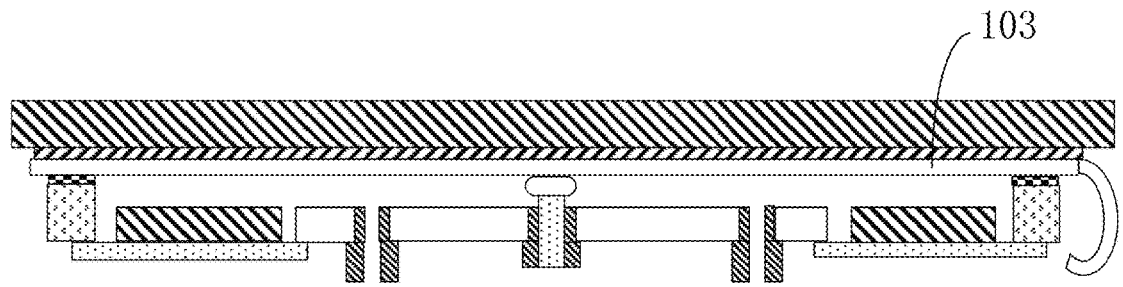
FIG. 22 is a schematic structural diagram of a touchpad provided in Embodiment 7 of the present disclosure.

Specifically, in order to make the overall module structure of the touchpad thinner, as shown in FIG. 22, a flexible printed circuit (FPC) 103 may also be used to replace the PCB. Specifically, a touch sensing area is composed of the FPC 103, a touch sensor, and other electronic materials. An overall thickness of the touchpad module may be reduced by 0.3 mm, without the need for a connector, connection is made through a connecting finger of the FPC and a corresponding communication interface of the laptop keyboard or leather keyboard.

Figure 23:
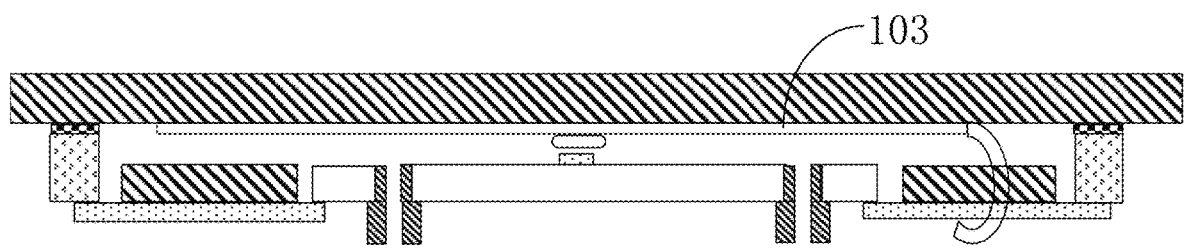
FIG. 23 is a schematic structural diagram of another touchpad provided in Embodiment 7 of the present disclosure.

In another possible embodiment, as shown in FIG. 23, the touch sensing area may also be placed on a bottom of the cover plate 101, that is, the main support member 105 is fixed on the cover plate 101 through the adhesive glue 106, the touch sensor and other electronic materials are combined on the FPC 103 through SMT to form a FPCB. A size of the FPC 103 is smaller than a size of the cover plate 101. The module may be further thinned by 0.3 mm, and a minimum thickness of the module may be 2.2 mm, without the need for a connector, connection is made through the connecting finger of the FPC and the corresponding communication interface of the laptop keyboard or leather keyboard.

In the above, the structure in the present embodiment is only used as an example for description, which is not intended to limit the present disclosure.

It should be understood that, in the embodiments of the present disclosure, "B corresponding to A" indicates that B is associated with A, and B may be determined according to A. However, it should also be understood that determining B according to A does not mean that B is only determined according to A, and B may also be determined according to A and/or other information.

In addition, the term "and/or" herein is only an association relationship to describe associated objects, indicating that there may be three kinds of relationships, for example, A and/or B, it may indicate three cases: A exists alone, A and B exist at the same time, and B exists alone. In addition, the character "/" herein generally indicates that there is an "or" relationship between the associated objects.

Those of ordinary skill in the art may realize that the units and algorithm steps of examples described in conjunction with the embodiments disclosed herein can be implemented in electronic hardware, or a combination of computer software and electronic hardware. Whether these functions are performed in hardware or software depends on the specific application and design constraints of the technical solution. Those skilled in the art may implement the described functions using different methods for each particular application, but such implementations should not be considered beyond the scope of the present disclosure.

Those skilled in the art may clearly understand that, for the convenience and brevity of description, the specific operating processes of the systems, apparatuses and units described above may refer to the corresponding processes in the foregoing method embodiments, detailed description thereof will be omitted.

In several embodiments provided in the present disclosure, it should be understood that the disclosed systems, apparatuses and methods may be implemented in other ways. For example, the apparatus embodiments described above are only illustrative. For example, the division of the units is only a logical function division. In actual implementation, there may be other division methods. For example, multiple units or components may be combined or may be integrated into another system, or some features may be omitted, or not implemented. On the other hand, the shown or discussed mutual coupling or direct coupling or communication connection may be through some interfaces, indirect coupling or communication connection of apparatuses or units may be in electrical, mechanical or other forms.

The units described as separate parts may or may not be physically separated, and parts displayed as units may or may not be physical units, that is, may be located in one place, or may be distributed to multiple network units. Some or all of the units may be selected according to actual needs to achieve the purpose of the solution in this embodiment.

In addition, each functional unit in the embodiments of the present disclosure may be integrated into one processing unit, or each unit may exist physically alone, or two or more units may be integrated into one unit.

It should be understood that the specific examples in the embodiments of the present disclosure are only to help those skilled in the art to better understand the embodiments of the present disclosure, rather than limiting the scope of the embodiments of the present disclosure, and those skilled in the art may make various improvements and modifications on the basis of the above embodiments, and these improvements or modifications all fall within the protection scope of the present disclosure.

The above descriptions are only specific embodiments of the present disclosure, but the protection scope of the present disclosure is not limited thereto. Any person skilled in the art may easily think of changes or substitutions within the technical scope disclosed in the present disclosure, which should be covered by the protection scope of the present disclosure. Therefore, the protection scope of the present disclosure should be subject to the protection scope of the claims.

What is claimed is:

1. A touchpad module, comprising:
    a moving part, wherein the moving part has a touch panel, a main support member and a travel switch arranged on a bottom surface of the touch panel, the main support member is arranged on an edge of the bottom surface of the touch panel, and the main support member has a first border and a second border opposite to each other;
    a fixing part, wherein the fixing part has a fixing platform, and a contact point is provided on a surface of the fixing platform close to the moving part; and
    a deforming part, wherein the deforming part has a first elastic member, a second elastic member, a first connecting member and a second connecting member, the first connecting member is attached to the first elastic member, the second connecting member is attached to the second elastic member, the first elastic member is connected between the first border of the main support member and the fixing platform, and the second elastic member is connected between the second border of the main support member and the fixing platform;

the deforming part is configured to elastically deform when the touch panel is pressed, so that the moving part moves along a pressing direction, and the contact point contacts and triggers the travel switch;

wherein the first elastic member comprises a first main body portion, a first elastic arm and a second elastic arm; and the first elastic member further comprises a first cantilever beam and a second cantilever beam arranged on one side of the first main body portion, and a third cantilever beam and a fourth cantilever beam arranged on the other side of the first main body portion, the first elastic member is connected to the first border of the main support member through the first cantilever beam and the second cantilever beam, and the first elastic member is connected to the fixing platform through the third cantilever beam and the fourth cantilever beam.

2. The touchpad module according to claim 1, wherein the second elastic member comprises a second main body portion, a third elastic arm and a fourth elastic arm; and the second elastic member further comprises a fifth cantilever beam and a sixth cantilever beam arranged on one side of the second main body portion, and a seventh cantilever beam and an eighth cantilever beam arranged on the other side of the second main body portion, the second elastic member is connected to the second border of the main support member through the fifth cantilever beam and the sixth cantilever beam, and the second elastic member is connected to the fixing platform through the seventh cantilever beam and the eighth cantilever beam.

3. The touchpad module according to claim 2, wherein the first elastic member and the second elastic member are symmetrically arranged with respect to a center of the touchpad module, the first elastic arm is butted with the third elastic arm, the second elastic arm is butted with the fourth elastic arm, and an opening portion for accommodating the fixing platform is formed between the first elastic member and the second elastic member.

4. The touchpad module according to claim 3, wherein a first gap exists between the first elastic arm and the third elastic arm and between the second elastic arm and the fourth elastic arm.

5. The touchpad module according to claim 3, wherein the first elastic member and the second elastic member are integrally formed, so that the first elastic arm and the third elastic arm are connected, and the second elastic arm and the fourth elastic arm are connected, a through hole is provided in a center of a connection position of the first elastic arm and the third elastic arm such that the first elastic arm and the third elastic arm are partially connected, and a through hole is provided in a center of a connection position of the second elastic arm and the fourth elastic arm such that the second elastic arm and the fourth elastic arm are partially connected.

6. The touchpad module according to claim 3, wherein the first connecting member is attached to the first elastic member; and the second connecting member is attached to the second elastic member.

7. The touchpad module according to claim 6, wherein the first connecting member has a first support arm and a second support arm, the first support arm is configured to reinforce the first elastic arm, and the second support arm is configured to reinforce the second elastic arm; and the second connecting member has a third support arm and a fourth support arm, the third support arm is configured to reinforce the third elastic arm, and the fourth support arm is configured to reinforce the fourth elastic arm.

8. The touchpad module according to claim 7, wherein, the first support arm has a first protruding portion, the first protruding portion extends to an area where the third elastic arm is disposed, so that the first support arm partially overlaps the third elastic arm, the third support arm has a third protruding portion, the third protruding portion extends to an area where the first elastic arm is disposed, so that the third support arm partially overlaps the first elastic arm, and the first protruding portion and the third protruding portion do not interfere with each other; and the second support arm has a second protruding portion, the second protruding portion extends to an area where the fourth elastic arm is disposed, so that the second support arm partially overlaps the fourth elastic arm, the fourth support arm has a fourth protruding portion, the fourth protruding portion extends to an area where the second elastic arm is disposed, so that the fourth support arm partially overlaps the second elastic arm, and the second protruding portion and the fourth protruding portion do not interfere with each other.

9. The touchpad module according to claim 1, wherein the touch panel comprises a cover plate and a circuit board, the cover plate is connected to the circuit board through a fixing glue for the cover plate, and the circuit board is connected to the main support member through an adhesive glue.

10. The touchpad module according to claim 1, wherein the circuit board is a printed circuit board PCB, or a flexible printed circuit board FPC.

11. The touchpad module according to claim 1, wherein the touch panel comprises a cover plate and a circuit board, a size of the circuit board is smaller than a size of the cover plate, the cover plate is connected to the circuit board through a fixing glue for the cover plate, and the cover plate is connected to the main support member through an adhesive glue.

12. The touchpad module according to claim 11, wherein the circuit board is a flexible printed circuit board FPC.

13. The touchpad module according to claim 10, wherein the travel switch is arranged in a center of a bottom surface of the circuit board.

14. The touchpad module according to claim 1, wherein the contact point is an adjusting screw, and an adjusting nut is provided in a center of the fixing platform for fixing the adjusting screw; or the contact point is a conductive base, and there is a gap between the conductive base and the travel switch.

15. The touchpad module according to claim 1, wherein the fixing platform is configured with fixing screws through which the touchpad module is fixedly connected to an electronic apparatus housing.

16. The touchpad module according to claim 1, wherein the fixing platform is provided with a fixing member, the fixing member is provided with a through hole outside a projection area of the cover plate, and the touchpad module is fixedly connected to an electronic apparatus housing through the through hole.

17. The touchpad module according to claim 1, wherein the fixing platform has a contact surface that is bent and recessed in a direction away from the cover plate, and the contact surface is fixedly connected to an electronic apparatus housing through a module fixing glue.

18. An electronic apparatus, comprising the touchpad module according to claim 1, and an electronic apparatus housing, wherein the touchpad module is fixedly installed in the electronic apparatus housing.

* * * * *